W. H. BURNS.
METHOD OF PRESERVING EGGS.
APPLICATION FILED MAR. 30, 1909.
938,965.
Patented Nov. 2, 1909.
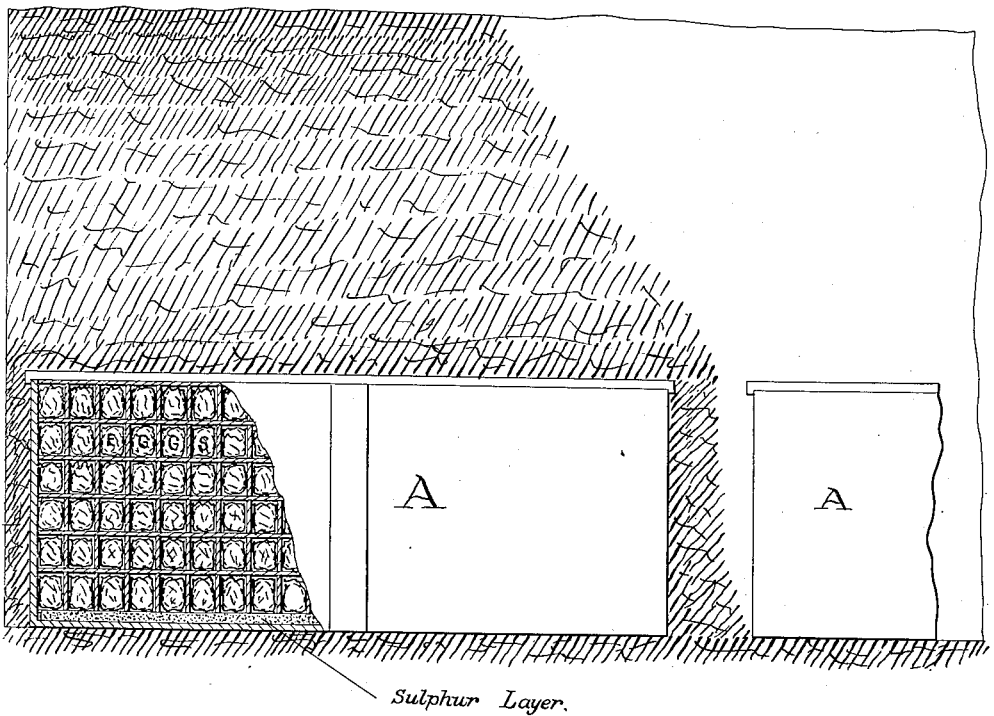
Attest:
Edwd L. Tolson
Edward N. Santon
Inventor:
William Henry Burns,
By Spear, Middleton, Donaldson & Spear
Atty's

UNITED STATES PATENT OFFICE.

WILLIAM HENRY BURNS, OF NAPERVILLE, ILLINOIS.

METHOD OF PRESERVING EGGS.

938,965.  Specification of Letters Patent.  Patented Nov. 2, 1909.

Application filed March 30, 1909. Serial No. 486,781.

*To all whom it may concern:*

Be it known that I, WILLIAM HENRY BURNS, a citizen of the United States, residing at Naperville, Illinois, have invented certain new and useful Improvements in Methods of Preserving Eggs, of which the following is a specification.

My invention relates to a method of preserving eggs and the like, it being the purpose of my invention to so preserve them as to prevent the formation of bacteria; to keep the eggs from shrinking and the egg shells from discoloration.

In the drawing I have shown in the single view a case adapted to contain the eggs to be treated according to my invention.

I do not limit myself to any particular construction of the case.

In carrying out my invention I take a case such as that shown at A, and in the bottom thereof I place a layer of flower of sulfur of one-fourth to one-half of an inch in thickness. I take the eggs to be treated and preferably immerse them in alcohol, removing them immediately, and then wrap them preferably in paraffin or other waterproof paper after which the eggs are placed in the case upon the layer of sulfur. The case is then deposited in an opening made in the ground at a depth of from 15 to 36 inches, the earth being carefully packed around the case and covering it providing a confined space. From the presence of the sulfur, the oxygen and the moisture an atmosphere is produced which is antiseptic and prevents the formation of destructive bacteria. The natural dampness or moisture in the earth surrounding the case prevents the eggs from shrinking. The waterproof wrapping prevents the growth of micro organisms and keeps the egg shells from discoloration, or absorbing the taste of the package. I use water-proof paper as this does not adhere to the egg and while it is not so tightly wrapped about the eggs as to prevent access of moisture thereto it protects the eggs, keeps them clean and allows their withdrawal from the water-proof wrapper very easily. The eggs are also kept from direct contact with the sulfur.

I may use the ordinary egg carrier made up of compartments for holding the eggs separate, such a compartment being shown in the drawing.

What I claim is:

The herein described method of preserving eggs and the like, consisting in first immersing the eggs in alcohol, wrapping them in a loose water proof cover, placing the eggs in a case upon a layer of sulfur and then placing the case under ground in a confined space, substantially as described.

In testimony whereof, I affix my signature in presence of two witnesses.

WILLIAM HENRY BURNS.

Witnesses:
J. M. DUTER,
EDWARD J. GETZ.